*INVENTOR,*
ALAN HOFER

*BY* R. A. Mann
ATTORNEY

INVENTOR,
ALAN HOFER

BY

R. A. Mason

ATTORNEY

United States Patent Office 3,454,896
Patented July 8, 1969

3,454,896
MINIATURE AUDIO AMPLIFIERS

Alan Hofer, Laurelton, N.Y., assignor to Dyna Magnetic Devices, Inc., Hicksville, N.Y., a corporation of New York Filed Oct. 7, 1965, Ser. No. 493,829
Int. Cl. H03f *3/04*
U.S. Cl. 330—40 2 Claims

ABSTRACT OF THE DISCLOSURE

A rugged multi-transistor audio frequency amplifier, thoroughly shielded from the effects of ambient electric, magnetic and electromagnetic fields. A compact amplifier configuration surrounded by a metal casing of high permeance and good electrical conductivity as well. A pair of input and a pair of output feed-through capacitors correspondingly connect with the contained amplifier. The casing and capacitors are in a symmetrical arrangement that by-passes impinging radio frequency potentials from the amplifier circuit.

This invention relates generally to miniature multi-stage amplifiers, and more particularly to novel stabilized transistor amplifiers the operation of which is unaffected by substantial fluctuations in operating voltage or the presence of intense external fields.

The amplifiers hereof are stable in performance, low in noise, rugged, light in weight and small in volume. They are particularly suitable for use in aircraft and space vehicles, as intercommunication preamplifiers. With an available gain of the order of 60 db, a three-stage low-voltage transistor circuit arrangement in accordance with the present invention affords desirably shaped frequency characteristics. Unique circuital features provide uniform high gain in the mid-range, as between 300 and 2500 cycles, tapering to cutoff above and below this range. Such shaped amplification, with negligible distortion, is optimum for use with small dynamic microphones designed for pilot use in noisy surroundings. They are of noise-suppressing electrodynamic construction, generally of the order of 5 ohms impedance. The amplifiers operate from a source of D.C. potential, and are immune to potential reversal.

The invention amplifiers permit the direct replacement of the older type carbon granule microphones for helmets, oxygen masks, and the like, by the more advantageous dynamic microphones referred to. The resultant communication quality is greatly improved, particularly at high altitudes. Further, the danger of minute sparks always present when using carbon granule microphones is avoided therewith for oxygen masks. The overall dimensions of the invention miniature preamplifiers may be made to readily fit into the space heretofore provided merely for the terminal block for a carbon microphone. The overall amplifier hereof may, for example be proportioned to fit within a cylindrical casing the order of one-inch in diameter by one-half inch thick; and weight, less than 0.75 ounce. In linear form the amplifier may be made to fit within rectangular shaped casings having a volume the order of one-half cubic inch, or less.

The above and other features, advantages and objects of this invention will become more apparent from the following description thereof, illustrated in the drawings, in which.

Figure 1:
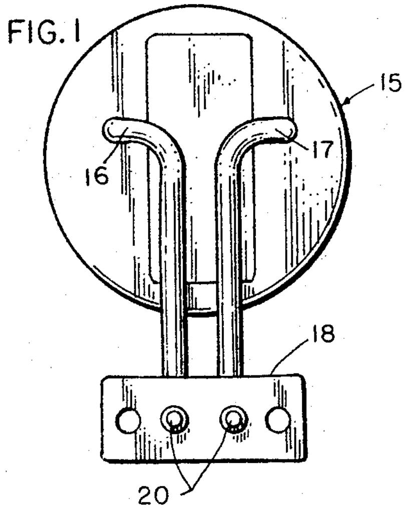
FIG. 1 is a front face view of a cylindrical arrangement embodying the exemplary amplifier.
Figure 2:
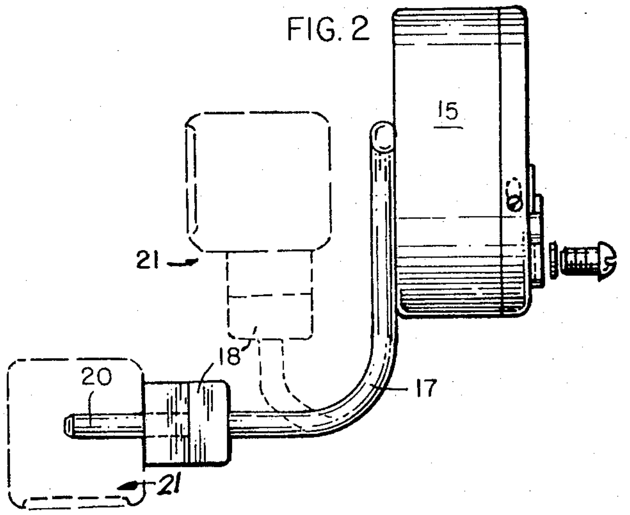
FIG. 2 is a side elevational view of the amplifier of FIG. 1.
Figure 3:
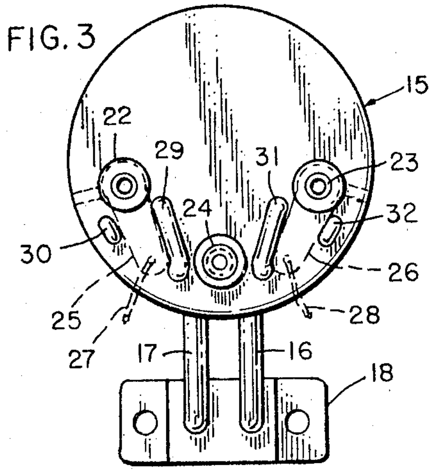
FIG. 3 is a rear face view of the FIG. 1 amplifier.
Figure 4:
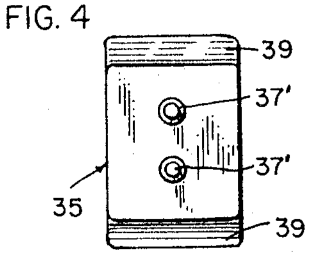
FIGS. 4 and 5 are end and face views of a rectangular amplifier configuration.
Figure 5:
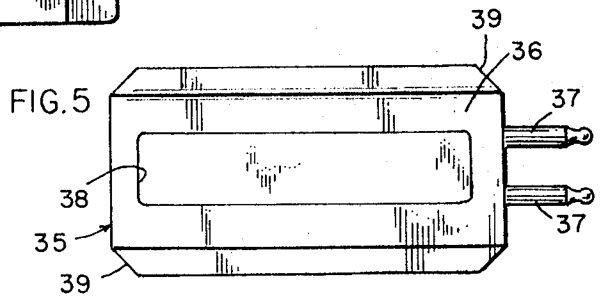
Figure 6:
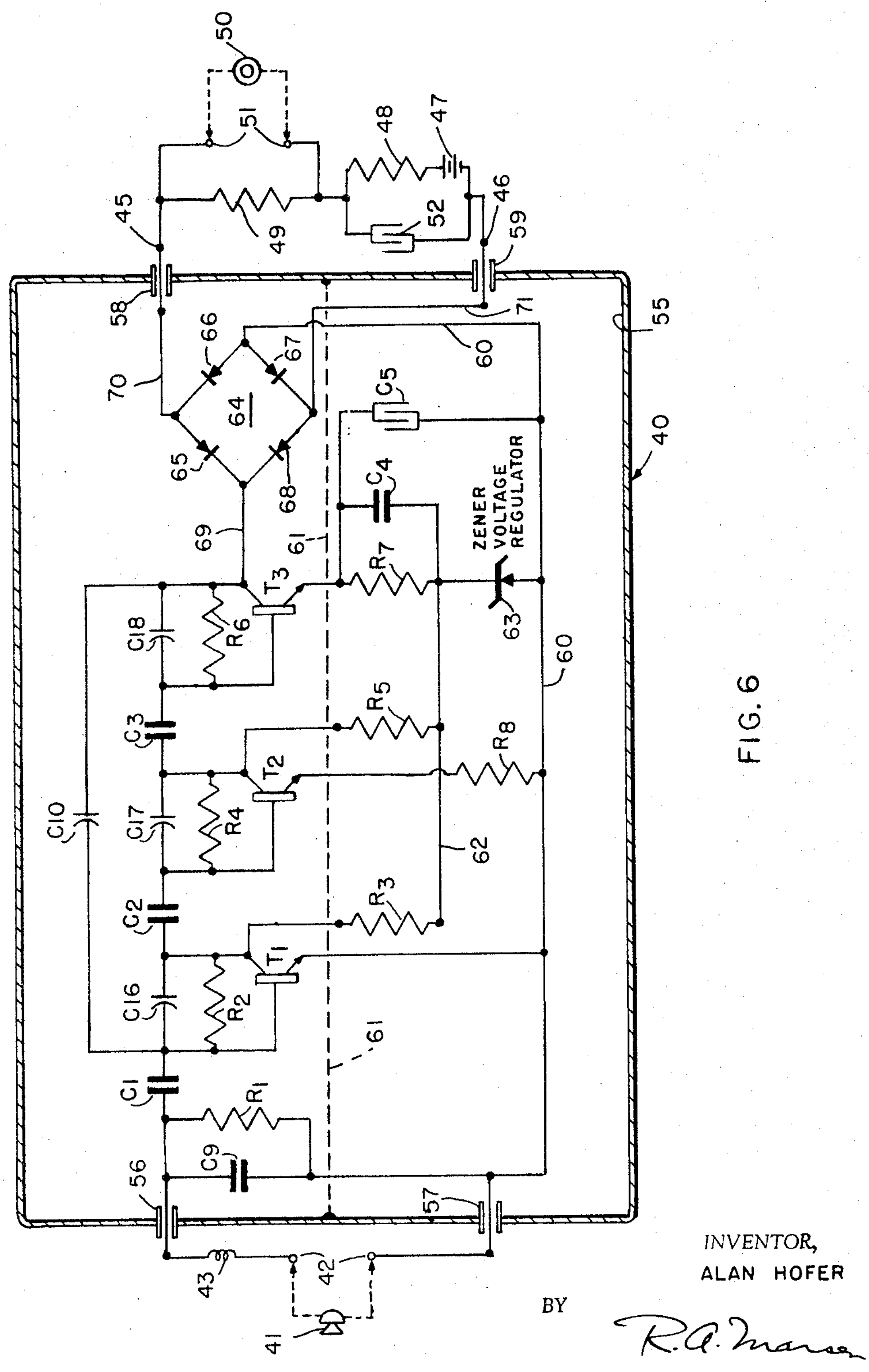
FIG. 6 is a schematic circuit diagram of the exemplary amplifier.

FIGS. 1, 2 and 3 illustrate cylindrical amplifier module 15 containing the full three-stage transistor exemplary amplifier hereof; FIGS. 4 and 5, the linear or rectangular form 35. The exterior housing of amplifier structure 15 is made of suitable tough plastic material. The contained amplifier, to be described hereinafter in connection with FIG. 6, is fully encased in a metal shell or casing of magnetic shielding material having high permeance and good electrical conductivity. The plastic housing overlies the metal shielding. Insulated deformable wire leads 16, 17 extend from the housing interior, as electrical input leads thereof. Leads 16, 17 are terminated in a connection plug 18 having male prongs 20, 20. A small dynamic microphone 21, indicated in dashed outline, is connected to the amplifier 15 through plug 18 as shown in FIG. 2. The drawings of FIGS. 1–5 are to twice scale.

Leads 16, 17 support the microphone 21 in space near the pilot's mouth. The amplifier module 15 is placed in a suitable interior pocket in the helmet or mask, with its wires 16, 17 extending towards the mouth region. The exemplary leads 16, 17 are 0.080″ in diameter, copper alloy conductors, insulation coated. They are relatively short, and stably hold their configuration when bent. The microphone thus may be oriented for use in any suitable position within the mask or helmet, as indicated in two separated locations 21, 21′ with respect to the amplifier 15.

The earphone and battery connections to amplifier 15 are established through terminal inserts 22, 23 on its rear face. Insert 24 is an anchor element to secure a strain relief lug (not shown). Terminal lugs 25, 26, indicated in dashed lines, are fastened to respective inserts 22, 23 with suitable machine screws. Connection leads 27, 28 extend from lugs 25, 26 respectively. A molded nest is provided to firmly secure each lug in position: raised insulating guide rails 29, 30 for lug 25; and rails 31, 32 for lug 26. For further ruggedizing, socket type set screws are used to lock the terminal screws when set in their inserts. The cylindrical amplifier structure 15 is readily made as a 1.125″ cylinder by 0.5″ thick with the full amplifier hereof therein.

FIGS. 4 and 5 illustrate a typical generally rectangular form of the amplifier 35. Again, the exterior is a tough molded plastic, over a magnetic shield type of metal casing for the contained electronic components. The exemplary casing, indicated at 55 in FIG. 6 is a "HY-MU 80" flat metal can, 0.008″ thick, annealed and deep drawn. The terminals of amplifier 35 are arranged to engage on a snap-on, snap-off relationship with standard terminal arrays. Two such male terminals 37, 37 extend from one end of the amplifier; and two female terminals 37′, 37′ are inset on its opposite end. These terminals have sufficient restraining force to withstand normal pulls on the connection cords. A suitable escutcheon or label 38 is readily affixed to one of its flat faces 36; its corners 39, 39 optionally slanted. The exemplary dimensions of amplifier 35 are: 1.5″ x 0.75″ x .5″, having a volume of about one-half cubic inch. It may be made considerably smaller with the same circuit and internal components.

FIG. 6 is a schematic circuit diagram of a practical form of the invention amplifier cartridge 40. At its input side, microphone 41 connects to terminals 42, 42. A small radio frequency choke coil 43 is in series circuit in the two-terminal input configuration. A two-terminal output 45, 46 connects with the D-C power source and earphone 50. The battery supply circuit comprises a battery 47 in series with limiting resistors 48, 49, across terminals 45, 46. Resistor 49 is also an output resistance, across which extend terminals 51, 51. Earphone 50 is connected to terminals 51, 51, as indicated with dashed lines. A sizable bypass capacitor 52 is in shunt across battery 47 and resistor 48.

Cartridge 40 is constructed to exclude severe audio magnetic fields from surrounding electronic equipment, and to shield against intense radio frequency field potentials, as well as other magnetic and electric fields, from impinging upon its interior circuitry. Towards this end, a casing 55, as of high-nickel alloy steel or other high permeance magnetic shielding material, completely surrounds the contained components, including a soldered lid. Casing 55 is thinly copper plated both inside and out, and soldered around all joints to constitute an electrically conductive shield. Also, feed-through capacitors are used for the input and output terminal wiring through the sealed metal casing 55, 56, 57 at the input; and 58, 59 at the output. The outer concentric electrode of each feed-through capacitor 56–59 is conductively connected with the casing 55. These feed-through capacitors act to by-pass radio frequency currents from the input conductors to the outside surface of the casing 55 and from there to the output conductors, without electronic effect upon the amplifier circuit 40 within the casing 55. They are in paired symmetrical array. The net result is excellent shielding of the amplifier circuit hereof against significant electric, magnetic, and electromagnetic fields.

The amplifier circuit comprises a plurality of cascaded transistor stages; $T_1$, $T_2$, $T_3$ in the exemplary unit. The emitter of each transistor amplifier stage is connected to a common conductor 60. In view of the non-polarized nature of the amplifier system 40, its components are ungrounded. A central equivalent ground reference-potential is indicated as dashed line 61 across casing 55 midway between feed-through terminals 56, 58 and 57, 59. The feed-through capacitors balance the radio frequency potentials on the input and output leads to the common reference-potential 61 to which the amplifier is not sensitive. The collectors of the first two transistor stages $T_1$ and $T_2$ have their operating potential supplied by conductor 62, in a voltage-stabilized manner. A Zener diode 63 is coupled between conductors 60 and 62. A diode bridge 64 conducts D-C potential directly to third amplifier stage $T_3$, the emitter of which is in series with the Zener diode 63 and a resistor $R_7$.

The diode bridge 64 is composed of four diodes 65 to 68 arrayed to provide the direct current operating voltage to the amplifier system in the proper direction, regardless of the polarity of battery 47. This advantage is evident upon analysis of the circuit arrangement of diodes 65 to 68. When terminal 45 is positive, current flows from lead 70 through diode 65 and lead 69 to the collector of transistor $T_3$. The direct current returns through conductor 60 and diode 67, to lead 71 and negative terminal 46. When output terminals 45, 46 have the D-C polarity reversed, current flows from the then positive point 46, through lead 71, diode 68, and lead 79 to the collector of $T_3$. Current return is through conductor 60, diode 66, lead 70 to the then negative terminal 45.

Thus, for either orientation of D-C polarity applied to output terminals 45, 46, conductor 60 remains at the battery negative potential, and lead 69 to the collector of the NPN output transistor $T_3$ is always positive, as required for normal operation. Also, importantly, the audio signals amplified by cartridge 40 are passed efficiently and without distortion from output transistor $T_3$ through diode bridge 64 to transducer 50. A unidirectional operating current flows from battery 47 through limiting resistor 48, output load resistor 49, bridge 64 and the collector to emitter path of $T_3$. Signal amplification by output stage $T_3$ results in direct modulation of the unidirectional current. Such audio modulations pass directly through the diode bridge 64 to earphone 50.

The operating D-C voltage supply to the amplifier system is established across leads 60, 69. This voltage is thus applied across output transistor $T_3$, dropping resistor $R_7$ and Zener diode 63. The input bias of stage $T_3$ is supplied by feedback resistor $R_6$ between its base and collector. The output operating unidirectional current flow from collector to emitter of transistor $T_3$ produces a corresponding voltage drop through resistor $R_7$. The voltage drop across the Zener reference voltage regulator 63 remains constant, despite variation in the applied battery voltage 47 and the current through $T_3$ and $R_7$.

In the exemplary amplifier 40 for a battery 47 with nominal 24 volts, the Zener reference is 2.7 volts. The amplifier hereof operates with negligible change in gain over a battery voltage range of 22 to 30; and within about a 2 db gain difference over a 10 to 40 volt supply range. With a type 2N3391 transistor at output stage $T_3$, series dropping resistor $R_7$ is about 1200 ohms across which is connected a 2 microfarad electrolytic capacitor $C_4$. Importantly, capacitor $C_4$ is proportioned to compensate for the inductive effect of the diode 63. The use of resistor $R_7$ and capacitor $C_4$ in parallel, and both in series with the Zener diode 63 render the voltage regulation action practical. Capacitor $C_5$ is a by-pass for the emitter of transistor $T_3$ to common return 60 being 52 microfarads herein. A smooth unvarying low potential supply is thus provided for stages $T_1$ and $T_2$ from the conductors 60, 62 across the Zener diode.

The initial stages $T_1$ and $T_2$ are arranged for relatively high amplification levels as compared to that of output stage $T_3$. Further, the preamplifier stages $T_1$ and $T_2$ are selected for relatively low potential operation, namely that maintained by the Zener diode 63. There results less transistor noise, smaller stage components and less battery consumption. The nominal stage gain for $T_1$ is 25 db; for stage $T_2$, 25 db; for stage $T_3$, 10 db. The relatively lower gain for output stage $T_3$ avoids the requirement of voltage regulation therefor. A part of the voltage drop from the emitter of stage $T_3$ to negative lead 60 accordingly provides the powering of the initial amplifier stages hereof, which power is closely regulated as to voltage level by the Zener diode. An ordinary diode or a transistor may replace Zener diode 63 in some applications of this advantageous principle.

The amplifier input loading is by shunt resistor $R_1$ as of the order of 5 ohms and shunt capacitor $C_9$ as 2.2 microfarads. The first amplifying stage $T_1$ is operatively biased by resistors $R_2$ and $R_3$. Its collector is directly coupled to the constant voltage supply line 62 from the Zener diode 63 by a dropping or limiting resistor $R_3$, as of 1000 ohms. The base bias is applied by a feedback coupling resistor $R_2$, as of 10,000 ohms. The normal level of signal input to amplifier 40 is in the order of 250 microvolts; its internal noise less than one microvolt, which is a favorable combination. The microphone signal input at terminals 42, 42 is coupled to the input of stage $T_1$ by a suitable coupling capacitor $C_1$ to its base and directly to its emitter. The amplified output of transistor stage $T_1$, in the order of 25 db gain is coupled to the base input of the second stage $T_2$ through coupling capacitor $C_2$.

A tiny radio frequency choke coil 43 is connected with the amplifier 40, in series with the microphone input, when specific R-F interference may be encountered in the field. Thus, a small two turn coil 43, air core, in an input lead effectively stops conducted signals of over 0.5 megacycle from entering the amplifier. Such coil, as 2 microhenries, is too small as a pickup inductor for hum or acoustic frequency interference. The R-F choke coil 43 may advantageously be incorporated within the cartridge casing 55, or optionally outside thereof as indicated in FIG. 6.

Transistors $T_1$ and $T_2$ are of the NPN type and are similarly operatively biased. The collector of $T_2$ connects to steady positive potential line 62; and its base to the collector through resistance $R_4$. The emitter of stage $T_2$ is preferably established at a bias potential a little above that of common return line 60 through a low resistance $R_8$, in the range of 10 to 150 ohms in the exemplary amplifier. $R_4$ is 27,000 ohms for intermediate stage $T_2$; its gain is also in the order of 25 db. The output of transistor stage $T_2$ is coupled from its collector through coupling capacitor $C_3$ to the base of output stage $T_3$. The operating biasing of stage $T_3$ was set forth hereinabove. Its stage gain is in the order of 10 db, and voltage regulation therefor is not important.

The amplifier 40 has an overall gain of the order of 60 db with the two-stage preamplifier. Its gain level between 300 and 2500 cycles is readily made uniform within 1.0 db, with negligible signal distortion. It is proportioned to roll-off below 300 cycles: 6 db less at 100 cycles; and 6 db less at 2500 cycles. Such frequency amplification characteristic in the audio range has been found to provide optimum ration of speech signal to sound interference; for best intelligibility against a noise background.

Such frequency roll-off is accomplished herein by circuit additions of tiny capacitors, mainly by C–16, C–17, C–18 and C–10. These capacitors also serve to facilitate the elimination of high audio frequency noise, and the bypassing of radio frequency interference directly through the amplifier. It is noted that another important advantage of the invention amplifier system 40 hereof is the accomplishment of all its stated functions and characteristics without the use of any coupling transformer or toroidal coil. This results in lower cost, greater reliability, smaller space and weight, and advantageously no tendency to pick up extraneous audio level signals, hum or noise.

Capacitors C–16, C–17 and C–18 are respectively connected between the base and collector of the three stages $T_1$, $T_2$ and $T_3$. Their capacitance values in the exemplary circuit are: .068 microfarad for C–16; .02 microfarad for C–17; and .004 microfarad for C–18. Condensers C–16 and C–17 are predominant in the roll-off action; C–18, in higher frequency suppression. A tiny capacitor C–10 is connected across the input and output of the amplifier, namely from the base of $T_1$ to the collector of $T_3$. It effects a regenerative boost for the upper end of the audio frequency gain curve herein. Its exemplary value is .00047 microfarad.

A theoretical insight as to the action of the principal frequency shaping capacitors C–16, C–17, C–18 follows. The audio frequency potential across each of these is proportional to the output of the respective stage less the input potential. These capacitors have an effect equivalent to that of shunt capacitors connected across the respective transistor outputs and having values equal to the original capacitance gain of the respective stage. In other words, the apparent shunt capacitance is the product of the actual capacitance times the gain. In this manner the smallest possible capacitor can be utilized for the said roll-off. Each condenser C–16, C–17, C–18 is selected, for the most part, according to the effective impedance of the respective stage.

Although the present invention has been described in connection with exemplary arrangements, it is to be understood that modifications may be made therein within the broader spirit and scope of this invention as set forth in the following claims.

What is claimed is:

1. An audio amplifier system comprising: a multi-stage amplifier circuit having a transistor preamplifier and an output transistor stage, circuit means for connecting an external source of unidirectional operating potential to said output transistor stage, a Zener diode in circuit with the current flow through an output impedance of said output transistor stage, a by-pass capacitor connected across the said output impedance and said Zener diode, and circuit connections from across said Zener diode to said preamplifier to supply unidirectional potential thereto as derived from said output transistor stage and maintained at a predetermined magnitude that is substantially less than that of said operating potential source; a stage capacitor connected between the input and output of each amplifier stage, said stage capacitors being proportioned to selectively roll-off the response of the amplifier system above a preselected uniform gain region in the system frequency band; coupling capacitors successively connecting the output of each amplifier stage to the input of the next stage thereby forming a series capacitor chain from the input to the output across the amplifier circuit whereby radio frequency signals are by-passed through the audio amplifier system; a metal casing of high permeance and good conductivity surrounding said amplifier circuit; and a plurality of feed-through capacitors extending through said casing in symmetrical paired array, the internal electrodes of said capacitors externally connecting the input and output of the contained amplifier circuit, and the outer electrodes thereof being conductively connected to said casing, said casing and feed-through capacitors forming an electrical bridge to balance-out impinging radio frequency potentials from the contained amplifier circuit.

2. An audio amplifier system as claimed in claim 1, including a further capacitor having substantially smaller capacitance than the other said capacitors, directly connected between the input of said transistor preamplifier and the output of said output transistor stage.

References Cited

UNITED STATES PATENTS

| | | | |
|---|---|---|---|
| 3,256,491 | 6/1966 | Dewey et al. | 330—109 X |
| 3,048,659 | 8/1962 | Crow et al. | 330—40 X |
| 3,059,109 | 10/1962 | Silberbach | 307—88.5 X |
| 3,333,210 | 7/1967 | Valdettaro | 331—97 |

FOREIGN PATENTS

| | | |
|---|---|---|
| 610,913 | 12/1960 | Canada. |

OTHER REFERENCES

Ives—Reverse Protection for Transistors. Radio Electronics, p. 36.

ROY LAKE, *Primary Examiner.*

LAWRENCE J. DAHL, *Assistant Examiner.*

U.S. Cl. X.R.

330—24